United States Patent
Vu et al.

(10) Patent No.: US 9,979,053 B2
(45) Date of Patent: May 22, 2018

(54) HYBRID BATTERY SYSTEM

(71) Applicant: A123 Systems, LLC, Waltham, MA (US)

(72) Inventors: Viet Vu, Canton, MI (US); Michael R. Wixom, Ann Arbor, MI (US)

(73) Assignee: A123 Systems, LLC, Waltham, MA (US)

( * ) Notice: Subject to any disclaimer, the term of this patent is extended or adjusted under 35 U.S.C. 154(b) by 249 days.

(21) Appl. No.: 14/364,221

(22) PCT Filed: Dec. 5, 2012

(86) PCT No.: PCT/US2012/067844
§ 371 (c)(1),
(2) Date: Jun. 10, 2014

(87) PCT Pub. No.: WO2013/090080
PCT Pub. Date: Jun. 20, 2013

(65) Prior Publication Data
US 2014/0368158 A1 Dec. 18, 2014

Related U.S. Application Data

(60) Provisional application No. 61/570,920, filed on Dec. 15, 2011.

(51) Int. Cl.
*H02J 7/00* (2006.01)
*H01M 10/42* (2006.01)
(Continued)

(52) U.S. Cl.
CPC ..... *H01M 10/4207* (2013.01); *H01M 10/441* (2013.01); *H02J 7/0052* (2013.01);
(Continued)

(58) Field of Classification Search
CPC . Y02T 10/7005; Y02T 90/14; Y02T 10/7077; Y02T 10/6221; Y02T 10/7061;
(Continued)

(56) References Cited

U.S. PATENT DOCUMENTS 5,422,200 A 6/1995 Hope et al.
5,443,602 A 8/1995 Kejha
(Continued)

FOREIGN PATENT DOCUMENTS

CN 101504977 A 8/2009
EP 0609101 A1 8/1994
(Continued)

OTHER PUBLICATIONS

Chen, C. et al., "Symmetric Cell Approach Towards Simplified Study of Cathode and Anode Behavior in Lithium Ion Batteries," Electrochemistry Communications, vol. 3, No. 1, Jan. 2001, 4 pages.
(Continued)

*Primary Examiner* — Binh Tat
(74) *Attorney, Agent, or Firm* — McCoy Russell LLP

(57) ABSTRACT

A rechargeable, hybrid battery system incorporates a high power battery component and a high energy density battery component. The voltage of the high energy density battery varies as a function of its state of charge, but remains greater than the voltage of the high power battery throughout the operating range of the battery system.

17 Claims, 2 Drawing Sheets

(51) Int. Cl.
*H01M 10/44* (2006.01)
*H01M 4/38* (2006.01)
*H01M 4/525* (2010.01)
*H01M 4/58* (2010.01)
*H01M 4/587* (2010.01)

(52) U.S. Cl.
CPC ............ *H01M 4/386* (2013.01); *H01M 4/387* (2013.01); *H01M 4/525* (2013.01); *H01M 4/587* (2013.01); *H01M 4/5825* (2013.01)

(58) Field of Classification Search
CPC ............ Y02T 10/7016; Y02T 10/7011; Y02T 10/7088; B60L 11/185; B60L 11/123; B60L 11/1866; B60L 2210/40; B60L 2240/545; B60L 2240/549; B60L 8/003; B60L 11/1811; B60L 2200/26; B60L 2240/547; H02J 7/0027; H02J 7/0045; H02J 7/0013; H02J 7/0026; H02J 7/0065; H02J 7/0011
USPC .................................................. 320/107–115
See application file for complete search history.

(56) References Cited

U.S. PATENT DOCUMENTS

| | | | |
|---|---|---|---|
| 5,529,707 A | 6/1996 | Kejha | |
| 5,597,658 A | 1/1997 | Kejha | |
| 5,705,084 A | 1/1998 | Kejha | |
| 5,744,258 A | 4/1998 | Bai et al. | |
| 5,747,195 A | 5/1998 | Alamgir et al. | |
| 5,750,289 A | 5/1998 | Kejha | |
| 5,811,959 A | 9/1998 | Kejha | |
| 5,882,721 A | 3/1999 | Delnick | |
| 5,925,483 A | 7/1999 | Kejha et al. | |
| 5,952,815 A | 9/1999 | Rouillard et al. | |
| 6,080,511 A | 6/2000 | Kejha | |
| 6,134,773 A | 10/2000 | Kejha | |
| 6,143,445 A | 11/2000 | Ferment et al. | |
| 6,251,540 B1 | 6/2001 | Kejha | |
| 6,326,105 B1 | 12/2001 | Kejha et al. | |
| 6,468,697 B1 | 10/2002 | Ferment et al. | |
| 6,517,972 B1 | 2/2003 | Amatucci | |
| 6,627,337 B2 | 9/2003 | Gan et al. | |
| 6,908,711 B2 | 6/2005 | Fauteux et al. | |
| 7,036,616 B1 | 5/2006 | Kejha | |
| 7,079,893 B2 * | 7/2006 | Greatbatch | A61N 1/08 320/103 |
| 7,141,332 B2 | 11/2006 | Kejha et al. | |
| 7,186,473 B2 | 3/2007 | Shiue et al. | |
| 7,198,869 B2 | 4/2007 | Ghantous et al. | |
| 7,377,948 B2 | 5/2008 | Faris | |
| 7,399,554 B2 | 7/2008 | Kejha | |
| 7,635,541 B2 | 12/2009 | Scott et al. | |
| 7,713,313 B1 | 5/2010 | Smith et al. | |
| 7,829,223 B1 | 11/2010 | Smith et al. | |
| 7,940,028 B1 | 5/2011 | Hermann | |
| 2003/0207156 A1* | 11/2003 | Ovshinsky | H01M 10/613 429/9 |
| 2004/0131934 A1 | 7/2004 | Sugnaux et al. | |
| 2007/0166617 A1 | 7/2007 | Gozdz et al. | |
| 2007/0190369 A1* | 8/2007 | Leach | H02J 7/0018 429/9 |
| 2007/0212596 A1 | 9/2007 | Nebrigic et al. | |
| 2008/0199737 A1 | 8/2008 | Kazaryan et al. | |
| 2009/0289589 A1 | 11/2009 | Fujino et al. | |
| 2009/0297944 A1 | 12/2009 | Oh et al. | |
| 2010/0114235 A1* | 5/2010 | Jiang | A61N 1/378 607/34 |
| 2010/0131137 A1 | 5/2010 | Iida | |
| 2010/0141211 A1 | 6/2010 | Yazami | |
| 2011/0189520 A1 | 8/2011 | Carter et al. | |
| 2011/0248681 A1* | 10/2011 | Miller | H02J 7/0018 320/126 |

FOREIGN PATENT DOCUMENTS

| | | |
|---|---|---|
| EP | 1471545 A1 | 10/2004 |
| JP | H09298806 A | 11/1997 |
| JP | 2001339872 A | 12/2001 |
| JP | 2004111242 A | 4/2004 |
| JP | 2008260346 A | 10/2008 |
| KR | 1020110010000 A | 1/2011 |
| WO | 9507551 A1 | 3/1995 |
| WO | 0135483 A1 | 5/2001 |
| WO | 2004010520 A1 | 1/2004 |
| WO | 2004059758 A2 | 7/2004 |
| WO | 2005018038 A2 | 2/2005 |

OTHER PUBLICATIONS

Prosini, P. et al., "A Novel Intrinsically Porous Separator for Self-Standing Lithium-Ion Batteries," Electrochimica Acta, vol. 48, No. 3, Dec. 11, 2002, 7 pages.

Doyle, M. et al., "Computer Simulations of a Lithium-Ion Polymer Battery and Implications for Higher Capacity Next-Generation Battery Designs," Journal of the Electrochemical Society, vol. 150, No. 6, Jun. 2003, Available Online Apr. 11, 2003, 8 pages.

ISA Korean Intellectual Property Office, International Search Report Issued in Application No. PCT/US2012/067844, dated Mar. 21, 2013, WIPO, 3 pages.

ISA Korean Intellectual Property Office, Written Opinion of the International Searching Authority Issued in Application No. PCT/US2012/067844, dated Mar. 21, 2013, WIPO, 5 pages.

Japan Patent Office, Office Action Issued in Application No. 2014-547282, dated Nov. 22, 2016, 8 pages. (Submitted with Unofficial Translation).

* cited by examiner

HYBRID BATTERY SYSTEM

CROSS REFERENCE TO RELATED APPLICATIONS

This application claims priority of U.S. Provisional Application 61/570,920 filed Dec. 15, 2011, the disclosure of which is incorporated herein by reference.

GOVERNMENT RIGHTS

This invention was made with government support under FA9451-10-C-0270 awarded by the United States Air Force. The government has certain rights in the invention.

FIELD OF THE INVENTION

This invention relates to rechargeable battery systems, and more particularly to rechargeable battery systems which are capable of delivering high peak power and sustained power. In particular, the invention is directed to hybrid battery systems which include high power cells optimized to deliver high peak power levels and high energy density cells which are optimized to deliver large amounts of sustained power.

BACKGROUND OF THE INVENTION

There is a need for rechargeable battery systems which have a high energy density and hence are capable of storing and delivering large amounts of electrical energy per unit volume and/or weight, while also being capable of delivering high levels of peak power. Such high energy-high power battery systems have significant utility in a number of applications including military equipment, communication equipment, and robotics. However, energy density and power density of rechargeable batteries relate to each other in an inverse manner and this complicates the design of such rechargeable battery systems.

A high power density battery will always have a lower energy density than a battery optimized for high energy density. Power is related to the ability of a battery to discharge energy; therefore, release of energy in a high power battery is faster than in a high energy density battery. This high power load generates significant resistive heating which can create safety issues and impact the cycle life of the battery. Consequently, the cell size, cell geometry, and chemistries of high power batteries must be selected so as to allow for heat management. Consequently, high power batteries are not capable of storing and delivering as much energy per unit volume and/or size as are high energy density batteries.

On the other hand, high energy density batteries are optimized for delivering maximum energy per unit volume and/or weight and accordingly cannot safely deliver power at a rate comparable to that of high power batteries. Therefore, in order to achieve safe and reliable operation, a battery system must be maximized either for the delivery of high levels of power at a low energy density, or so as to have a high energy density and a low peak power capacity.

However, as noted above, practical applications often require a compact, high energy density power source which is also capable of providing high levels of peak power. Several approaches have been implemented in the prior art in an attempt to meet these conflicting goals. In one instance, the prior art has included a capacitor or ultra capacitor storage device in battery systems for accumulating and rapidly delivering high power pulses. This approach is limited insofar as the total amount of power which can be delivered by capacitor systems over long periods of time is relatively small, which greatly limits the utility of such systems. Furthermore, the sloping voltage profile of capacitor systems is not desirable when power has to be sustained over long periods of time. Typically, only 25% of the power stored in ultra capacitor based systems is practically usable. In another approach, a rechargeable high energy density battery system incorporates an auxiliary primary, non-rechargeable, battery. While such systems can meet particular power/energy profile needs, they are not practical for sustained operation since the primary battery must be replaced on a periodic basis. In other instances, the prior art has prepared hybrid, rechargeable battery systems which include a first group of cells optimized to deliver high power in conjunction with a second group of cells optimized to have a high energy density. Some such hybrid systems are shown in U.S. Pat. Nos. 7,399,554 and 7,635,541, as well as in U.S. Patent Application Publication 2007/0212596. Conventional wisdom had heretofore held that in hybrid battery systems of this type, voltages of the high energy and high power groups of cells must be identical so as to maintain proper operation of the system. Therefore, hybrid battery systems of the prior art were prepared utilizing generally identical battery chemistries for their high power and high energy segments. This necessity for matching of chemistries and voltages limits the design options for the hybrid battery system and furthermore requires the inclusion of charge/discharge control circuitry, all of which compromise the size, weight, and ultimate energy density of these hybrid systems. The constraint, in the prior art, of utilizing similar chemistries for power and energy electrodes has limited the options for hybrid battery systems, and is overcome by the present invention.

As will be explained hereinbelow, the present invention marks a break with the prior art insofar as it provides rechargeable hybrid battery systems which incorporate high power cells and high energy density cells having different voltages, charge/discharge characteristics, and chemistries. The differing cells of the present invention may also be designed with matching impedance and, as a result, the system of the present invention is inherently self-regulating with regard to charging and discharging and reduces or eliminates the use of charge controllers, switches, and the like. These and other advantages of the invention will be apparent from the drawings, discussion, and description which follow.

SUMMARY OF THE INVENTION

Disclosed is a hybrid, rechargeable battery system which includes a high power battery and a high energy density battery which are connected in a parallel electrical relationship. The open circuit voltage of the high energy density battery is greater than the open circuit voltage of the high power battery up to at least an 80% degree of discharge. In specific instances, the high power battery and the high energy density battery are lithium batteries and at least one of: the cathode material composition, the electrolyte composition, and the anode material composition of the high power battery and the high energy density battery differ.

In particular instances, the open circuit voltage of the high power battery is in the range of 3.2-3.5 at a 0 depth of discharge and is in the range of 3.1-3.5 at a depth of discharge of 0.5. In certain embodiments, the energy density of the high energy density battery is at least 250 WH/kg. In particular instances, the cathode of the high energy density battery comprises a lithium mixed metal oxide material which may include oxides of at least nickel and cobalt. In certain instances, the cathode of the high power battery includes a lithium iron phosphate material which may comprise a nanophase lithium iron phosphate material. The anode of the high energy density battery may comprise silicon and/or tin, and the anode of the high power battery may comprise graphitic carbon.

In specific implementations, at least 90% of the capacity of the battery system is provided by the high energy density battery.

In some instances, the impedance of the high power battery is in the range of 80-120% of the impedance of the high energy density battery, and in certain specific instances the impedance of the high power battery is in the range of 90-110% of the impedance of the high energy density battery.

DETAILED DESCRIPTION OF THE PREFERRED EMBODIMENTS

Figure 1:
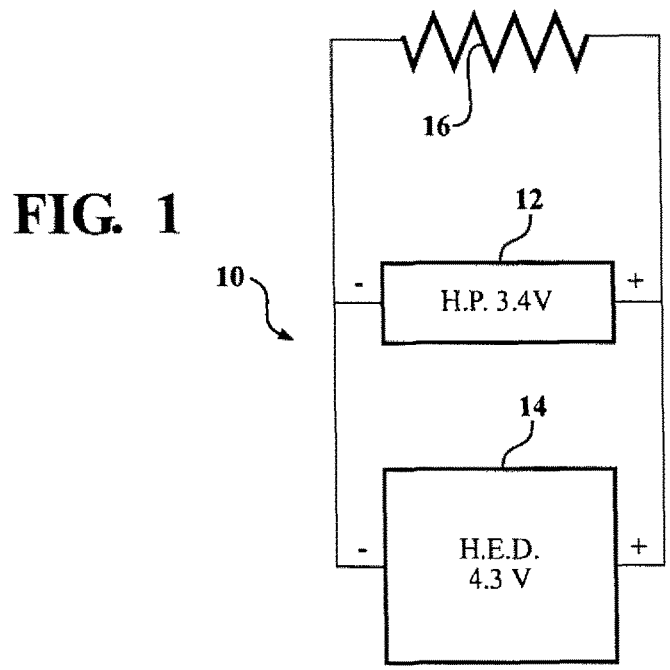
FIG. 1 shows a schematic diagram of a battery system of the present invention.

The present invention may be implemented in a number of embodiments. Some specific embodiments will be described herein, and others will be apparent to those of skill in the art in view of the teaching presented herein. Referring now to FIG. 1, there is shown a basic hybrid battery system 10 of the present invention. As will be seen from the figure, the system 10 includes a high power battery 12 disposed in a parallel electrical relationship with a high energy density battery 14. As further shown, the parallel string of batteries is in turn connected to a load 16. In those instances where the battery system is being recharged, the load 16 will be replaced by a source of electrical power. Within the context of this disclosure, the two components of the hybrid battery system are referred to as high power batteries and high energy density batteries. It is to be understood that each of these components may comprise a single electrochemical cell or a plurality of electrical cells connected in a series and/or parallel electrical relationship. Within the context of this disclosure, the term "battery" as applied to these components will be understood to include both single cells and aggregates of individual cells.

As will be noted from FIG. 1, the open circuit voltage of the high energy density battery 14 is 4.3 volts and, as such, is greater than the open circuit voltage of the high power battery 12 which is 3.4 volts. This voltage relationship is counter conventional wisdom which has held that voltages should be matched in a circuit such as this.

In a typical system of this type, at least 80% of the energy capacity of the system is provided by the high energy density battery 14, with the remainder being provided by the high power battery 12. In particular instances at least 90% of the capacity. In a specific instances, the system is configured such that approximately 95-96% of the capacity of the battery system is provided by the high energy density battery 14.

In some embodiments of the present invention, the impedance of the high energy density battery 14 and the high power battery 12 will be matched such that impedance of the high power battery is in the range of 80-120% of the impedance of the high energy density battery. In particular instances, matching is such that the impedance of the high power battery is in the range of 90-110% of the impedance of the high energy density battery.

The high energy density battery 14 is capable of storing relatively large amounts of electrical energy per unit weight and in specific instances has an energy density which is at least 250 WH/kg. The energy density of this battery per unit volume will range up to 550 WH/L. The power density of the high energy density battery will typically be less than 1 KW/kg at 2 V5s from a 100% state of charge. Typical cathode materials for this battery include metal oxides such as nickel/cobalt oxides and, as is known in the art, may include coatings which further act to enhance elevated temperature safety and abuse tolerance. Anode materials for batteries of this type will typically include high energy density materials such as Si and Sn as well as alloys and composites thereof. A typical electrolyte for a high energy density battery will include nonflammable additives and lithium salts, such as $LiPF_6$, These additives generally are present in a concentration of less than 1 M and operate to shut down the battery when discharge rates of greater than 1 C of the cell capacity are occurring. Materials other than $LiPF_6$ may be likewise be used to enhance safety. Further safety considerations in batteries of this type will include the use of a heat-resistant barrier such as NCS to prevent the collapse of low melting polypropylene separator material when cell temperatures rise above 100° C. As such, it will be seen that the high energy density battery is optimized to reliably and safely store and deliver large amounts of electrical energy per unit weight/volume.

The high power battery 12 is relatively small and may be optimized to deliver exceptional pulse power while being thermally stable so as to withstand very high drain rates, including short circuits. Typical energy densities of the high power battery range upward from 70 Wh/kg and 150 Wh/L. Peak power density of the high power battery 12 will be typically greater than 5 KW/kg at 2 V5s at 100% state of charge. Typical cathode materials used in the high power battery will include lithium metal phosphate materials such as lithium iron phosphate materials. Anode materials for the high power battery 12 typically will comprise graphitic carbon or other such materials which can generate a flat voltage profile across a large degree of discharge.

Figure 2:
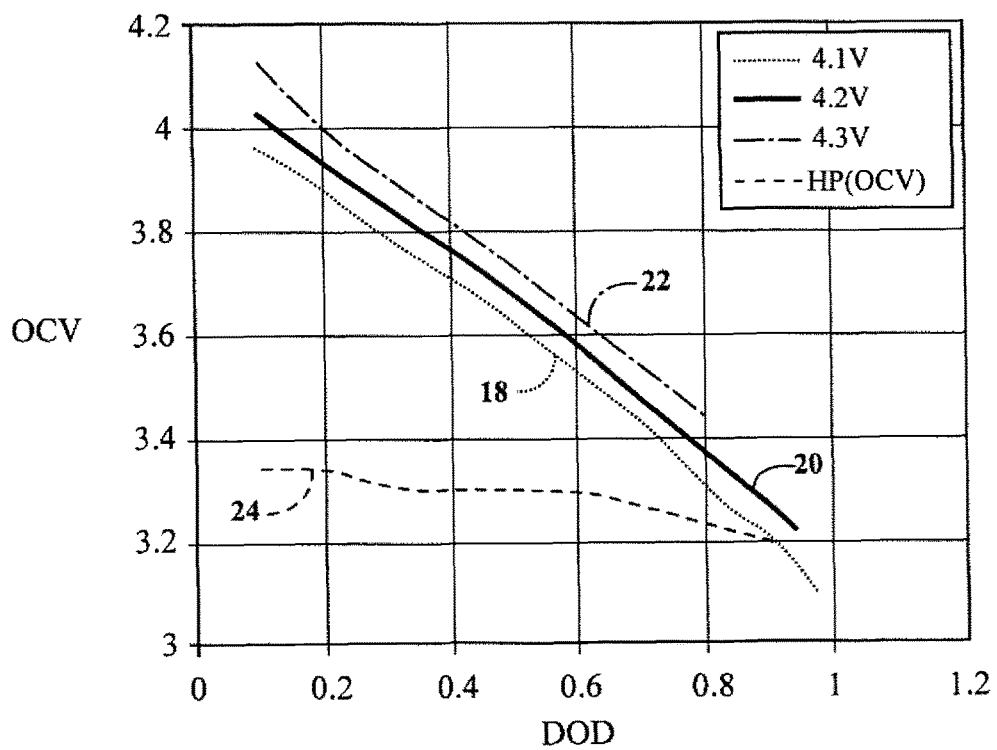
FIG. 2 is a graph plotting Open Circuit Voltage (OCV) versus Degree of Discharge (DOD) for high energy density cells and a high power cell of the type used in the present invention.

Referring now to FIG. 2, there is shown a graph comparing open circuit voltage (OCV) versus degree of discharge (DOD) for typical high energy density battery cells and high power battery cells which may be employed in the present invention. Curve 18 shows the open circuit voltage characteristics of a first high energy density cell of the present invention wherein open circuit voltage thereof is approximately 4.1 volts at a 0% degree of discharge (i.e. 100% degree of charge) and approximately 3.95 at a 10% degree of discharge. As will be seen, at an 80% degree of discharge the open circuit voltage of this cell is approximately 3.3 V. Curve 20 shows the voltage characteristics of another high energy density cell which may be used in the present invention, and this cell has an open circuit voltage of approximately 4.2 volts at a 0% degree of discharge. At a 10% degree of discharge its open circuit voltage is approximately 4.05 V, and at an 80% degree of discharge its open circuit voltage is approximately 3.35 V. A third type of high energy density cell is characterized by curve 22, and this cell has an open circuit voltage of approximately 4.3 V at a fully charged state, an open circuit voltage of approximately 4.15 at a 10% degree of discharge, and an open circuit voltage of approximately 3.45 at an 80% degree of discharge. What is notable about all of these cells is that their voltage/degree of discharge profile is strongly sloping such that voltage of these cells decreases significantly as a function of their state of charge/discharge.

Curve 24 shows the voltage profile of a typical high power cell used in the present invention. This high power cell may be of the type described above, typically incorporating a nanophosphate cathode. What is notable about curve 24 is that it is relatively flat and does not manifest a significant change in voltage as a function of charge state. In this regard, voltage of the cell at a 10% degree of discharge is approximately 3.35, while voltage at an 80% degree of discharge is approximately 3.25 V.

As will be seen from the foregoing, the materials comprising the high energy density battery and the high power battery are selected such that the open circuit voltage of the high energy density battery will decrease significantly as a function of its state of charge but will still be greater than the open circuit voltage of the high power battery across the entire operating range of the battery system. It has been found, in accord with the present invention, that by so selecting the characteristics of the batteries and by matching their impedances as described above, the hybrid battery system of the present invention will inherently be balanced without need for any charge control circuitry or the like.

The present invention allows for the fabrication of simple and reliable hybrid battery systems in which battery voltage is the sole energy transfer mechanism between the two battery components and between the hybrid battery system and the load or charging device. In the operation of the system, the high energy density battery 14 will normally deliver the bulk of power to the load, except in those instances where a very high draw is experienced, and the contribution from the high power battery 12 will increase. As the draw of the load decreases, the high energy density battery 14 will return to providing the majority of the energy for the load while also recharging the high power battery 12. It is to be understood that in some instances, various control elements may be incorporated into the hybrid battery systems of the present invention. For example voltage activated switches may be incorporated into the hybrid system to control the charge/discharge response of the system. These types of switches will not create any significant loss of power, and are differentiated from voltage conversion elements required by prior art hybrid battery systems.

It has been found that when high energy density batteries are integrated with high power batteries in accord with the teaching of the present invention, the two types of batteries interact synergistically so as to maximize advantages of each battery component while minimizing its negative characteristics. High energy density cells typically include anode materials fabricated from silicon and/or tin or composites thereof. While these anode materials allow for very high density of energy storage, they are prone to mechanical failure when operating at high discharge rates, and this mechanical failure adversely impacts the operational lifetime of these cells. It has been found that in hybrid systems of the present invention the inclusion of the high power cells minimizes the adverse effect of high discharge rate operation on the silicon anodes.

Figure 3:
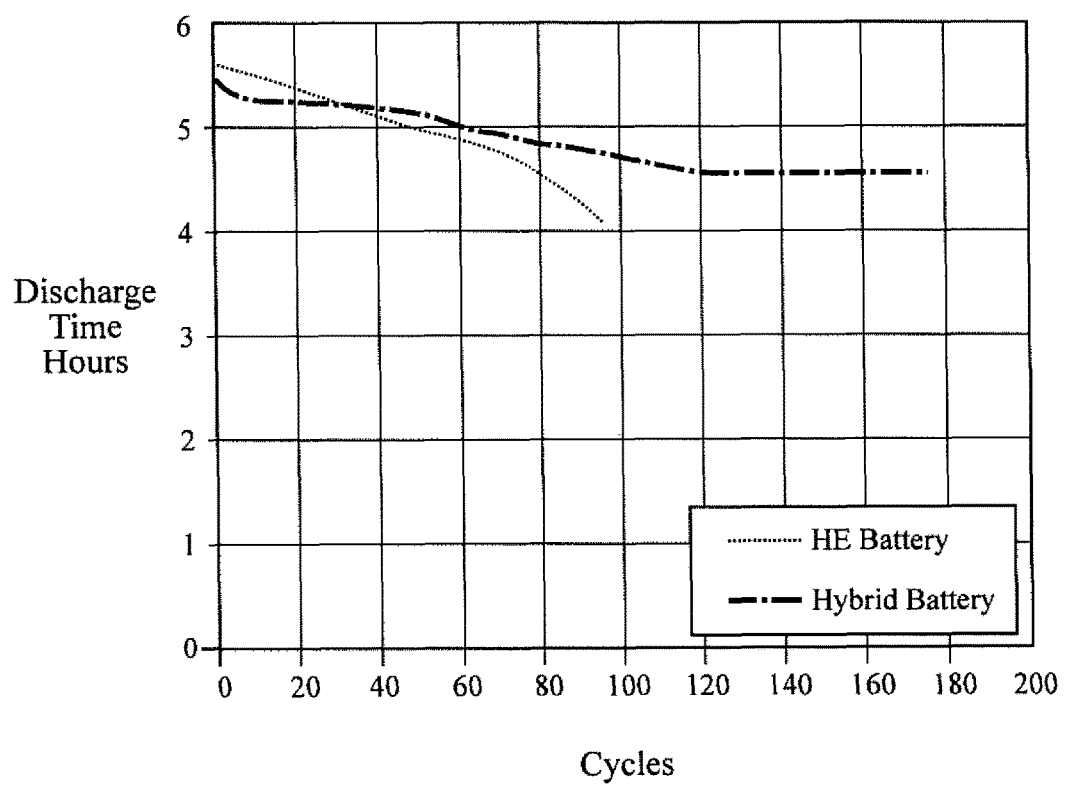
FIG. 3 is a graph plotting self discharge time in hours versus number of charge/discharge cycles for a high energy density battery and for a hybrid battery system of the present invention.

FIG. 3 is a graph of cycle life data for a conventional high energy battery employing a silicon anode and far a hybrid battery in accord with the present invention. The graph shows the discharge time of a cell as a function of the number of charge/discharge cycles it has gone through. As will be seen, performance of a conventional cell drops sharply after 90 charge/discharge cycles while hybrid cells of the present invention show no major drop in performance out to and possibly extending beyond 180 cycles. It should be noted that while the present invention eliminates the need for charge controllers, switching devices, and the like, in some instances for particular applications, relay switches, diodes, and the like may be incorporated into the hybrid battery system so as to switch the high energy density batteries and high power battery into and out of connection with one another and/or the load. Such systems will typically be used for very specialized applications and are within the scope of the present invention.

In view of the teaching of the concepts of the present invention presented herein, numerous modifications and variations thereof will be readily apparent to those of skill in the art. The foregoing drawings, discussion, and description are illustrative of particular embodiments of the invention but are not meant to be limitations upon the practice thereof. It is the following claims, including all equivalents, which define the scope of the invention.

The invention claimed is:

1. A hybrid, rechargeable battery system comprising:
a high power battery and a high energy density battery, where the high energy density battery has an energy density greater than the high power battery and a peak power density less than the high power battery, wherein the energy density of said high energy density battery is at least 250 WH/kg and wherein the peak power density of said high power battery is at least 5 KW/kg as measured when said high power battery is discharged from a fully charged state to 2 volts over 5 seconds, wherein the high power battery and the high energy density battery are connected in a parallel electrical relationship, and wherein an open circuit voltage of said high energy density battery is greater than an open circuit voltage of said high power battery up to at least an 80% degree of discharge.

2. The battery system of claim 1, wherein said high power battery and said high energy density battery are lithium batteries and at least one of a cathode material composition, an electrolyte composition, and an anode material composition of said high power battery and said high energy density battery differ.

3. The battery system of claim 1, wherein the open circuit voltage of said high energy density battery has a sloping profile versus the degree of discharge of said high energy density battery, wherein the open circuit voltage is in the range of 4.0-4.4 at a 0 degree of discharge and is in the range of 3.0-3.5 at a degree of discharge of 0.8.

4. The battery system of claim 1, wherein the open circuit voltage of said high power battery is in the range of 3.2-3.5 at a 0 degree of discharge and is in the range of 3.1-3.5 at a degree of discharge of 0.5.

5. The battery system of claim 1, wherein a cathode of the high energy density battery comprises a lithium mixed metal oxide material.

6. The battery system of claim 5, wherein said lithium mixed metal oxide material includes oxides of at least nickel and cobalt.

7. The battery system of claim 1, wherein a cathode of said high power battery includes a lithium iron phosphate material.

8. The battery system of claim 7, wherein said lithium iron phosphate material is a nanophase lithium iron phosphate material.

9. The battery system of claim 1, wherein an anode of said high energy density battery comprises silicon and/or tin.

10. The battery system of claim 1, wherein an anode of said high power battery comprises graphitic carbon.

11. The battery system of claim 1, wherein at least 90% of a capacity of said battery system is provided by said high energy density battery.

12. The battery system of claim 1, further including a controller which is operative to control a flow of electrical current between said high energy density battery and said high power battery.

13. The battery system of claim 1, further including a battery charger and a controller, wherein said controller is operative to control a flow of electrical current between said battery charger and at least one of said high power battery and said high energy density battery.

14. The battery system of claim 1, wherein an impedance of said high power battery is in the range of 80-120% of an impedance of said high energy density battery.

15. The battery system of claim 1, wherein an impedance of said high power battery is in the range of 90-110% of an impedance of said high energy density battery.

16. A hybrid, rechargeable battery system comprising:
a high power battery and a high energy density battery, where the high energy density battery has an energy density greater than the high power battery and a peak power density less than the high power battery, wherein an open circuit voltage of the high energy density battery is in the range of 4.0-4.4 at a 0 degree of discharge and is in the range of 3.0-3.5 at a degree of discharge of 0.8, wherein the high power battery and high energy density battery are connected in a parallel electrical relationship, wherein the open circuit voltage of said high energy density battery is greater than an open circuit voltage of said high power battery up to at least an 80% degree of discharge, and wherein the open circuit voltage of the high energy density battery has a sloping profile versus the degree of discharge of the high energy density battery.

17. A hybrid, rechargeable battery system comprising:
a high power battery and a high energy density battery, where the high energy density battery has an energy density greater than the high power battery and a peak power density less than the high power battery, wherein an open circuit voltage of said high power battery is in the range of 3.2-3.5 at a 0 degree of discharge and is in the range of 3.1-3.5 at a degree of discharge of 0.5, and wherein the high power battery and high energy density battery are connected in a parallel electrical relationship and wherein the energy density of said high energy density battery is at least 250 WH/kg and wherein the peak power density of said high power battery is at least 5 KW/kg as measured when said high power battery is discharged from a fully charged state to 2 volts over 5 seconds.

* * * * *